United States Patent
Liang et al.

(10) Patent No.: US 10,975,181 B1
(45) Date of Patent: Apr. 13, 2021

(54) ETHYLENE-VINYL ALCOHOL COPOLYMER AND PRODUCING METHOD THEREOF

(71) Applicant: CHANG CHUN PETROCHEMICAL CO., LTD., Taipei (TW)

(72) Inventors: Chih Chieh Liang, Taipei (TW); Chia Ying Chen, Taipei (TW); Wen Hsin Lin, Taipei (TW); Huan Ming Chang, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 17/137,658

(22) Filed: Dec. 30, 2020

(51) Int. Cl.
*C08F 116/06* (2006.01)

(52) U.S. Cl.
CPC .................. *C08F 116/06* (2013.01)

(58) Field of Classification Search
CPC .................. C08F 116/06; C08J 2329/04
See application file for complete search history.

(56) References Cited

U.S. PATENT DOCUMENTS

| 5,704,555 A | 1/1998 | Arastoopour |
| 9,624,439 B2 | 4/2017 | Bakaya et al. |
| 2004/0091653 A1 | 5/2004 | Tai et al. |
| 2016/0215076 A1* | 7/2016 | Lu .................. C08F 216/06 |

FOREIGN PATENT DOCUMENTS

AU 672108 B2 9/1996

* cited by examiner

*Primary Examiner* — Jeffrey C Mullis
(74) *Attorney, Agent, or Firm* — Polsinelli PC (57) ABSTRACT

Pellets of ethylene-vinyl alcohol copolymer having lamellar stacks of ethylene-vinyl alcohol copolymer with a long period determined by small-angle X-ray scattering of at least 8.35 nm. The lamellar stacks of ethylene-vinyl alcohol copolymer may have an average crystalline lamellar thickness of at least 6 nm. Additionally or alternatively, the lamellar stacks of ethylene-vinyl alcohol copolymer may have an average amorphous lamellar thickness of at least 2.35 nm. Methods are also provided for producing pellets of ethylene-vinyl alcohol copolymer, such as those having preferable lamellar stack properties, as described above.

24 Claims, 7 Drawing Sheets

ETHYLENE-VINYL ALCOHOL COPOLYMER AND PRODUCING METHOD THEREOF

FIELD OF THE DISCLOSURE

The instant disclosure is directed to pellets of ethylene-vinyl alcohol copolymer having an adjusted first melting point. Additionally, aspects of the disclosure are directed to methods of producing EVOH pellets having an adjusted first melting point.

BACKGROUND OF THE DISCLOSURE

Ethylene-vinyl alcohol copolymer resins are widely used to produce films and laminates for preserving perishable items. For example, films and laminates of ethylene-vinyl alcohol copolymer are commonly used by the food packaging industry, medical device and supplies industry, pharmaceutical industry, electronics industry, and agricultural chemicals industry. Ethylene-vinyl alcohol copolymer resins are often incorporated as a distinct layer within a laminate to serve as an oxygen-barrier layer.

Films and laminates of ethylene-vinyl alcohol copolymer are typically produced using an extrusion process, whereby an ethylene-vinyl alcohol copolymer resin (typically in the form of a pellet) is extruded to produce a film of ethylene-vinyl alcohol copolymer. Multi-layer extruders may be used to produce a laminate included additional films formed from different materials. In order to melt the pellets of ethylene-vinyl alcohol copolymer, extruders utilize temperatures at or near the melting point temperatures of the input materials for extrusion.

SUMMARY OF THE DISCLOSURE

The inventor's discovered that significant improvements in films and/or laminates of ethylene-vinyl alcohol copolymer may be obtained by adjusting the first, partial melting point temperature of a pellet of ethylene-vinyl alcohol copolymer to reduce such first, partial melting point temperature before the pellet is fed into the extruder. Without being limited to any particular theory, it is believed that the amount of partial early melting of the pellets of ethylene-vinyl alcohol copolymer may be reduced or eliminated by controlling the lamellar stacks of ethylene-vinyl alcohol copolymer of the pellets to have desired properties, such as long period, amorphous lamellar thickness, and/or crystalline lamellar thickness.

Typically, the pellets of ethylene-vinyl alcohol copolymer have lamellar stacks of ethylene-vinyl alcohol copolymer with a long period determined by small-angle X-ray scattering of at least 8.35 nm. The lamellar stacks of ethylene-vinyl alcohol copolymer may have an average crystalline lamellar thickness of at least 6 nm. Additionally or alternatively, the lamellar stacks of ethylene-vinyl alcohol copolymer may have an average amorphous lamellar thickness of at least 2.35 nm.

In some instances, the pellets comprise melting point temperatures $T_{m2}$ and $T_{m3}$, and optionally $T_{m1}$, wherein the melting point temperatures are determined by Differential Scanning calorimetry (DSC) according to ISO 11357-3:2011. If present, the $T_{m1}$ represents a first intercept point of two tangent lines in a first DSC run. Typically, the $T_{m2}$ represents a maximum point of a melting peak in the first DSC run and the $T_{m3}$ represents a maximum point of a melting peak in a second DSC run, wherein $T_{m1}<T_{m2}<T_{m3}$. Preferably, the $T_{m1}$ and the $T_{m2}$ may be within 65° C. of each other. The $T_{m1}$ and the $T_{m2}$ may be within 40° C. of each other. In some instances, the $T_{m2}$ and the $T_{m3}$ are within 4.5° C. of each other.

In accordance with another aspect of the disclosure, methods are provided for producing pellets of ethylene-vinyl alcohol copolymer, such as those having the preferable lamellar stack properties, as described herein. A method for making pellets of ethylene-vinyl alcohol copolymer typically comprises:

(a) drying particles of ethylene-vinyl alcohol copolymer, wherein the drying comprises subjecting the particles of ethylene-vinyl alcohol copolymer to a three stage drying process using a particle stack thickness of 100 cm or less, the three stage drying process comprising a first stage, a second stage following the first stage, and a third stage following the second stage,
  (i) the first stage comprising heating the pre-dried particles to a temperature of at least 65° C. for at least 2 hours,
  (ii) the second stage comprising heating the pre-dried particles to a temperature of at least 95° C. for at least 16 hours, and
  (iii) the third stage comprising heating the pre-dried particles to a temperature of at least 105° C. for 12 hours, provided that the temperature of the second stage is greater than the temperature of the first stage, and the temperature of the third stage is greater than the temperature of the second stage, and (b) pelletizing the particles of ethylene-vinyl alcohol copolymer to obtain pellets having lamellar stacks of ethylene-vinyl alcohol copolymer.

The method for producing pellets may include a third stage of drying comprising heating the pre-dried particles to a temperature of at least 110° C. for 16 hours. The temperature may be maintained within a range of 20° C. during at least one of the first stage, the second stage, and the third stage. In some instances, the drying of (a) is carried out using a belt type drying. The belt type dryer may have an air flow rate of at least 15 ton/hr.

The method may utilize pellets of ethylene-vinyl alcohol copolymer comprising 0.3 wt. % or less of moisture content, based on the total weight of the pellets. Additionally or alternatively, the ethylene-vinyl alcohol copolymer may have an ethylene content of 29 to 44 mole %. The lamellar stacks of the ethylene-vinyl alcohol copolymer of the pellet may have a long period determined by small-angle X-ray scattering of at least 8.35 nm. Preferably, the lamellar stacks of the ethylene-vinyl alcohol copolymer of the pellet have an average crystalline lamellar thickness of at least 6 nm. In at least some preferred instances, the lamellar stacks of ethylene-vinyl alcohol copolymer of the pellet have an average amorphous lamellar thickness of at least 2.35 nm.

The pellets typically comprise melting point temperatures $T_{m2}$ and $T_{m3}$, and optionally $T_{m1}$, wherein the melting point temperatures are determined by Differential Scanning calorimetry (DSC) according to ISO 11357-3:2011. In some instances, the $T_{m1}$, if present, represents a first intercept point of two tangent lines in a first DSC run, the $T_{m2}$ represents a maximum point of a melting peak in a first DSC run, and the $T_{m3}$ represents a maximum point of a melting peak in a second DSC run, wherein $T_{m1}<T_{m2}<T_{m3}$. Preferably, the $T_{m1}$ and the $T_{m2}$ are within 65° C. of each other. Additionally or alternatively, the $T_{m1}$ and the $T_{m2}$ are within 40° C. of each other. Further, in some cases, the $T_{m2}$ and the $T_{m3}$ may be within 4.5° C. of each other.

BRIEF DESCRIPTION OF THE DRAWING

Implementation of the present technology will now be described, by way of example only, with reference to the attached figures, wherein.

It should be understood that the various aspects are not limited to the arrangements and instrumentality shown in the drawings.

DETAILED DESCRIPTION OF THE DISCLOSURE

Figure 7:
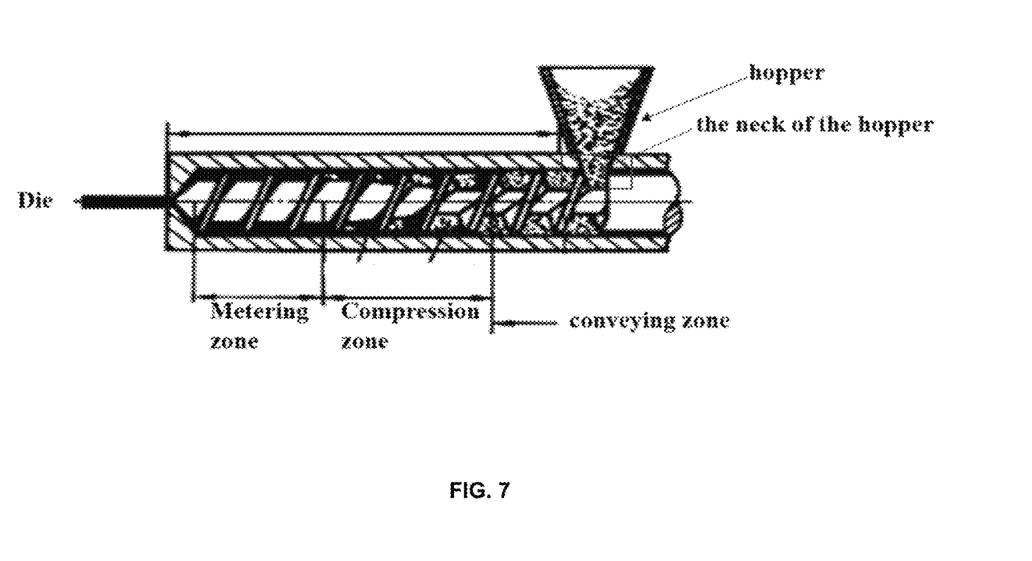
FIG. 7 is a cross-sectional view of a screw extruder with a hopper for feeding pellets ethylene-vinyl alcohol copolymer.

The inventor's discovered that significant improvements in the EVOH film or laminate may be obtained by adjusting the first, partial melting point temperature of a pellet of ethylene-vinyl alcohol (EVOH) copolymer to reduce such first, partial melting point temperature before the pellet is fed into an extruder. By reducing or eliminating the first, partial melting point temperature of pellets of ethylene-vinyl alcohol copolymer, the pellets melt less or do not melt in the neck of the hopper that feeds the pellets into the extruder (see, e.g., FIG. 7). Without being limited to any particular theory, it is believed that the amount of partial early melting of pellets of ethylene-vinyl alcohol copolymer may be reduced or eliminated by controlling the lamellar stacks of ethylene-vinyl alcohol copolymer of the pellets to have desired properties, such as long period, amorphous lamellar thickness, and/or crystalline lamellar thickness.

Figure 1:
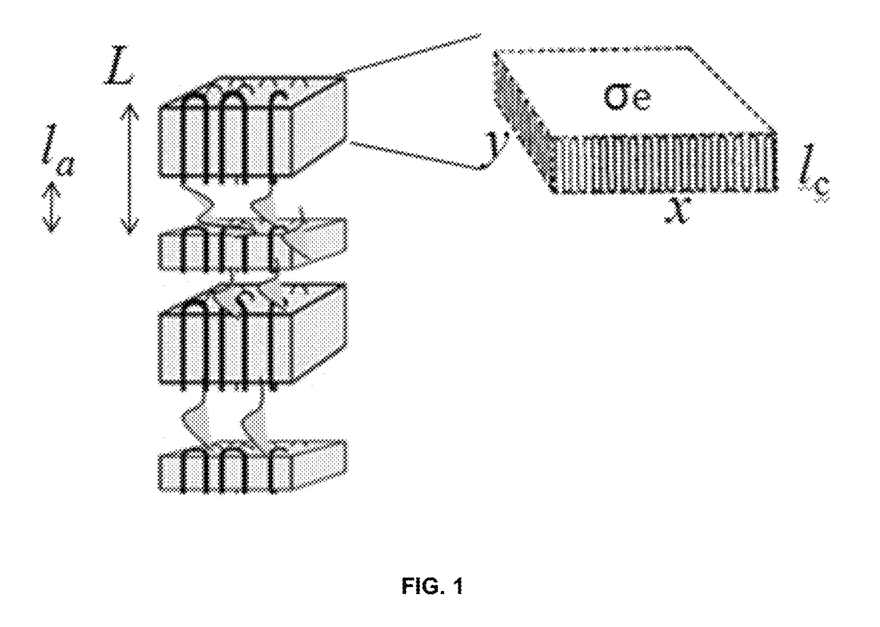
FIG. 1 is a schematic of the lamellar stacks of ethylene-vinyl alcohol copolymer for a pellet of ethylene-vinyl alcohol copolymer according to aspects of the disclosure.

In accordance with a first aspect of the disclosure, provided are pellets of ethylene-vinyl alcohol copolymer having lamellar stacks with a long period determined by small-angle X-ray scattering of at least 8.35 nm. As used herein, the term "long period" refers to the average crystalline lamellar thickness ($L_c$) added to the average amorphous lamellar thickness ($L_a$) of the lamellar stacks of the ethylene-based polymers, as determined by small angle X-ray scattering. Specifically, the long period is obtained by the Lorentz-corrected Small Angle X-Ray Scattering (SAXS) profile. A schematic of the lamellar stacks of ethylene-vinyl alcohol copolymer is provided in FIG. 1.

For example, SAXS data may be collected using a RIGAKU MICRO SOURCE X-ray Generator with "Cu radiation" and an area detector. The samples may be positioned in the beam using a precision step motor controlled via a PC (LAB VIEW software). The scattering data l(q) may be corrected for air background ($l(q)b$) before analysis, where q is a wave vector, and is equal to $(4\pi/\lambda)\sin(\theta/2)$, with λ and θ being the x-ray wavelength and scattering angle, respectively. The test sample is about one millimeter in thickness, and can be cut from a pellet. The surface area depends on the size of the x-ray beam, and can be adjusted accordingly.

For alternating crystalline and amorphous lamellar stacks formed by the ethylene-vinyl alcohol copolymers, the long period (L), which is the sum of the average amorphous lamellar thickness ($L_a$) and the average crystalline lamellar thickness ($L_c$) (($L)=(L_a)+(L_a)$), can be evaluated in the following three ways.

Method 1

In the first method, the long period, L, is determined from the Lorentz-corrected small angle scattering profile, "$l(q)q^2$ vs. q", where l(q) is the scattering intensity and q is scattering vector, and is defined by $q=4\pi \sin(\theta/2)/\lambda$, where λ is the wavelength of the x-ray and θ is the scattering angle. The long period can be derived from the following equation:

$$L=2\pi/q^*,$$

where q* is the peak position from the Lorentz corrected SAX profile. The method is described in detail, for example, in US Patent Publication No. 2013/0059967, which is incorporated herein by reference in its entirety for all purposes.

Method 2

In the second method, the long period is determined by a correlation function, when a good alternating crystalline-amorphous packing exists, as determined by small X-ray scattering angle data. A one dimensional correlation function (γ(z)) can be obtained from the SAXS data. The long period (L), the average amorphous lamellar thickness ($L_a$) and the average crystalline lamellar thickness ($L_a$), are each determined from the one-dimensional correlation function γ(z), which is obtained from the small angle X-ray raw data with the following:

$$\gamma(z)=(1\gamma(0))\int_0^\infty q^2[l(q)-l(q)_b]\cos(qz)dq$$

where z is the correlation distance along the direction from which the electron density distribution is measured. The q value is defined above. The l(q) value is the scattering intensity. Since the experimentally accessible q range is finite, it is necessary to extend the data to both lower and higher q values. The $l(q)_b$ value is the background scattering intensity. The "intensity versus q" data are linearly extrapolated from the smallest measured q value to zero. Large q values are damped to infinite q by using the Porod-Ruland theory, as described in Strobl, G. R.; Schneider, M. J. POLYM. SCI., POLYM. PHYS. ED. 1980, 18, 1343, and Glatter, O., Kratky, O. (Small Angle X-ray Scattering) (Academic Press: London, 1983), which are incorporated herein by reference in their entirety.

Figure 2:
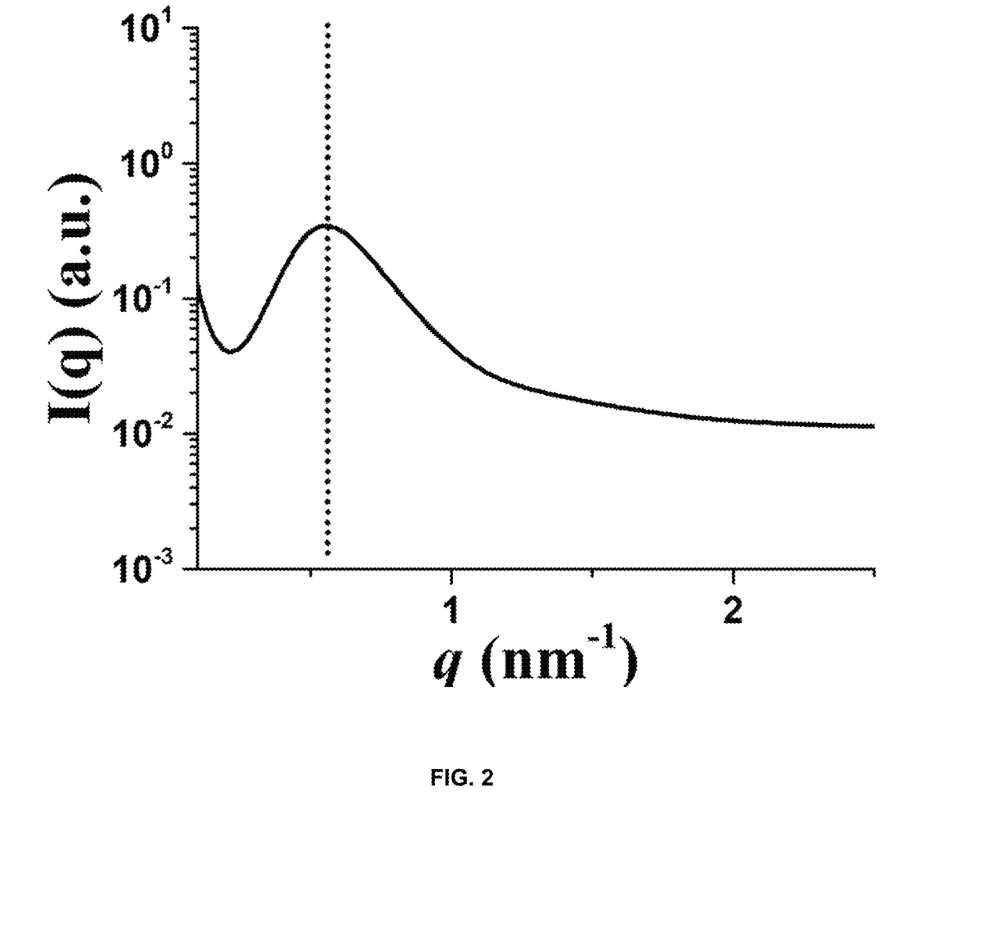
FIG. 2 is a graph of a 1D map of 2θ versus the scattering intensity for an exemplary pellet of ethylene-vinyl alcohol copolymer in accordance with aspects of the disclosure.
Figure 3:
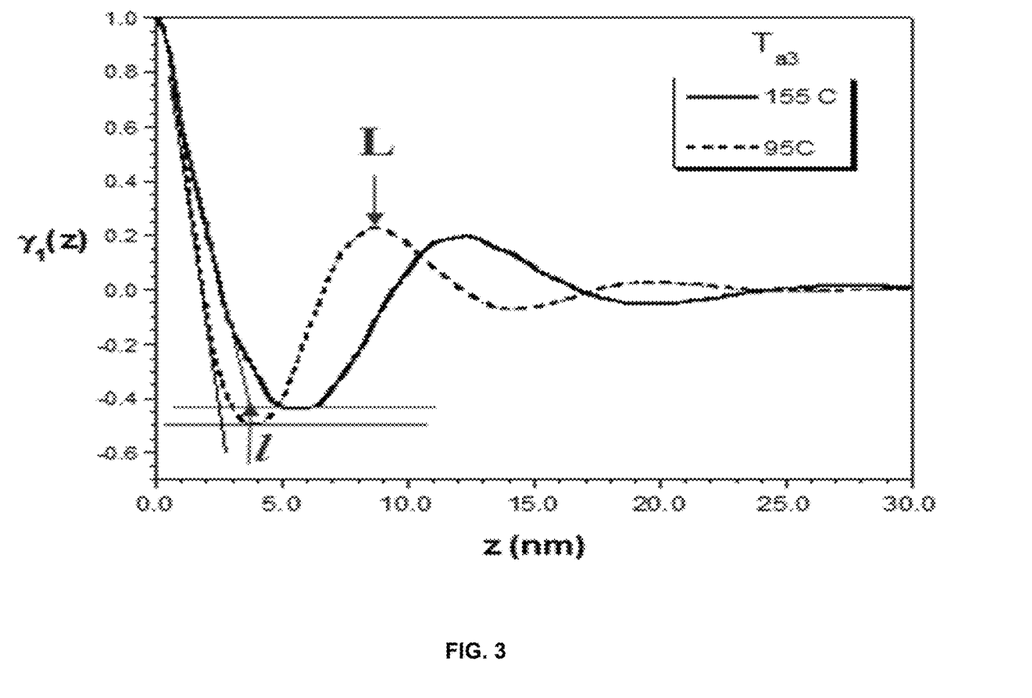
FIG. 3 is a graph illustrating the identification of the amorphous thickness and long period for an exemplary pellet of ethylene-vinyl alcohol copolymer in accordance with aspects of the disclosure.

X-ray scattering angle data may be obtained by fixing particles of the pellet of ethylene-vinyl alcohol copolymer to a sample holder, e.g., using Kapton tape (black heat-resistant tape) on both sides. After vacuuming, the sample may be exposed to an X-ray for 300 seconds and analyzed under a 2D scattering spectrum. A 1D plot of 2θ may be produced by taking an integral of the 2D scattering spectrum using a correlation function conversion formula. For example, FIG. 2 is a graph of a 1D map of 2θ versus the scattering intensity, which may be obtained using formula, $Q=4\pi \sin \theta/\lambda$, and a one dimensional correlation function conversion formula provided above. The intersection of the tangent line from Z=0 and the lowest point of the curve, which is identified as the amorphous thickness ("$l_a$"), starting from the lowest point is provided in FIG. 3. Additionally, the highest point of the graph of FIG. 3 is identified as the long period ("L"), and L minus "$l_a$" is equal to lamella thickness ("$l_c$").

In some instances, the lamellar stacks of ethylene-vinyl alcohol copolymer have a long period that is at least 8.40, at least 8.45, at least 8.5, at least 8.55, at least 8.6, at least 8.65, at least 8.7, at least 8.75, at least 8.8, at least 8.85, at least 8.9, at least 8.95. In some instances, the long period is at least 9, at least 9.1, at least 9.2, at least 9.3, at least 9.4, at least 9.5, at least 9.6, at least 9.7, at least 9.8, at least 9.9, at least 10, at least 10.1, at least 10.2, at least 10.3, at least 10.4, at least 10.5, at least 10.6, at least 10.7, at least 10.8, at least 10.9, at least 11, at least 11.1, at least 11.2, at least 11.3, at least 11.4, at least 11.5, at least 11.6, at least 11.7, at least 11.8, at least 11.9, at least 12, at least 12.1, at least 12.2, or at least 12.3.

The pellets of ethylene-vinyl alcohol copolymer may have lamellar stacks with an average crystalline lamellar thickness of at least 6 nm. In some cases, the average crystalline lamellar thickness is at least 6.1 nm, at least 6.2 nm, at least 6.3 nm, at least 6.4 nm, at least 6.5 nm, at least 6.6 nm, at least 6.7 nm, at least 6.8 nm, or at least 6.9 nm. In other cases, the average crystalline lamellar thickness is at least 7 nm, at least 7.1 nm, at least 7.2 nm, at least 7.3 nm, at least 7.4 nm, at least 7.5 nm, at least 7.6 nm, at least 7.7 nm, at least 7.8 nm, or at least 7.9 nm. Yet, in further cases, the average lamellar crystalline lamellar thickness is at least 8 nm, at least 8.1 nm, at least 8.2 nm, or at least 8.3 nm.

Preferably, the pellets of ethylene-vinyl alcohol copolymer have lamellar stacks with an average amorphous lamellar thickness of at least 2.35 nm. The average amorphous lamellar thickness may be at least 2.4 nm, at least 2.5 nm, at least 2.6 nm, at least 2.7 nm, at least 2.8 nm, or at least 2.9 nm. For example, the amorphous lamellar thickness may be at least 3 nm, at least 3.1 nm, at least 3.2 nm, at least 3.3 nm, at least 3.4 nm, at least 3.5 nm, at least 3.6 nm, at least 3.7 nm, at least 3.8 nm, or at least 3.9 nm. In some instances, the amorphous lamellar thickness is at least 4 nm, at least 4.1 nm, at least 4.2 nm, at least 4.3 nm, at least 4.4 nm, at least 4.5 nm, at least 4.6 nm, at least 4.7 nm, at least 4.8 nm, or at least 4.9 nm. In further instances, the amorphous lamellar thickness is at least 5 nm, at least 5.1 nm, at least 5.2 nm, at least 5.3 nm, at least 5.4 nm, at least 5.5 nm, at least 5.6 nm, at least 5.7 nm, at least 5.8 nm, or at least 5.9 nm. Yet, in additional instances, the amorphous lamellar thickness is at least 6 nm, at least 6.1 nm, at least 6.2 nm, at least 6.3 nm, at least 6.4 nm, at least 6.5 nm, at least 6.6 nm, at least 6.7 nm, at least 6.8 nm, or at least 6.9 nm.

The pellets may be formed from ethylene-vinyl alcohol copolymer having an ethylene content of about 20 to about 60 mol. %. For example, the ethylene content of the ethylene-vinyl alcohol copolymer may be about 20 to about 60 mol. %, about 20 to about 55 mol. %, about 20 to about 50 mol. %, about 20 to about 45 mol. %, about 20 to about 44 mol. %, about 20 to about 40 mol. %, about 20 to about 35 mol. %, about 20 to about 30 mol. %; about 25 to about 60 mol. %, about 25 to about 55 mol. %, about 25 to about 50 mol. %, about 25 to about 45 mol. %, about 25 to about 44 mol. %, about 25 to about 40 mol. %, about 25 to about 35 mol. %; about 29 to about 60 mol. %, about 29 to about 55 mol. %, about 29 to about 50 mol. %, about 29 to about 45 mol. %, about 29 to about 44 mol. %; about 35 to about 60 mol. %, about 35 to about 55 mol. %, about 35 to about 50 mol. %, about 35 to about 45 mol. %, about 35 to about 44 mol. %; about 40 to about 60 mol. %, about 40 to about 55 mol. %, about 40 to about 50 mol. %, including ranges and subranges therebetween. Preferably, the ethylene-vinyl alcohol copolymer has an ethylene content of 29 to 44 mol. %.

Preferably, the pellets of ethylene-vinyl alcohol copolymer have melting point temperatures $T_{m2}$ and $T_{m3}$, and, optionally $T_{m1}$, wherein the melting point temperatures are determined by Differential Scanning calorimetry (DSC) according to ISO 11357-3:2011. The melting points of the ethylene-vinyl alcohol copolymer (and pellets of the ethylene-vinyl alcohol copolymer) are determined according to ISO 11357-3:2011, which is incorporated herein by reference in its entirety. For example, melting points may be measured using a TA Instrument DSC Q200 (The Tzero lid being TA Instrument T 170607 and the Tzero pan being a TA Instrument T 170620), analyzed by TA Instruments Universal analysis 2000, wherein the Differential Scanning calorimetry (DSC) utilizes the following parameters:

1. Equilibrium at 50° C.;
2. Heat rate of 5° C./min and heat to 250° C. for the first run;
3. Equilibrium at 250° C.;
4. Cool rate of 5° C./min. and cool to 50° C.;
5. Equilibrium at 50° C.; and
6. Heat rate of 50° C./min and heat to 250° C. for the second run.

Figure 4:
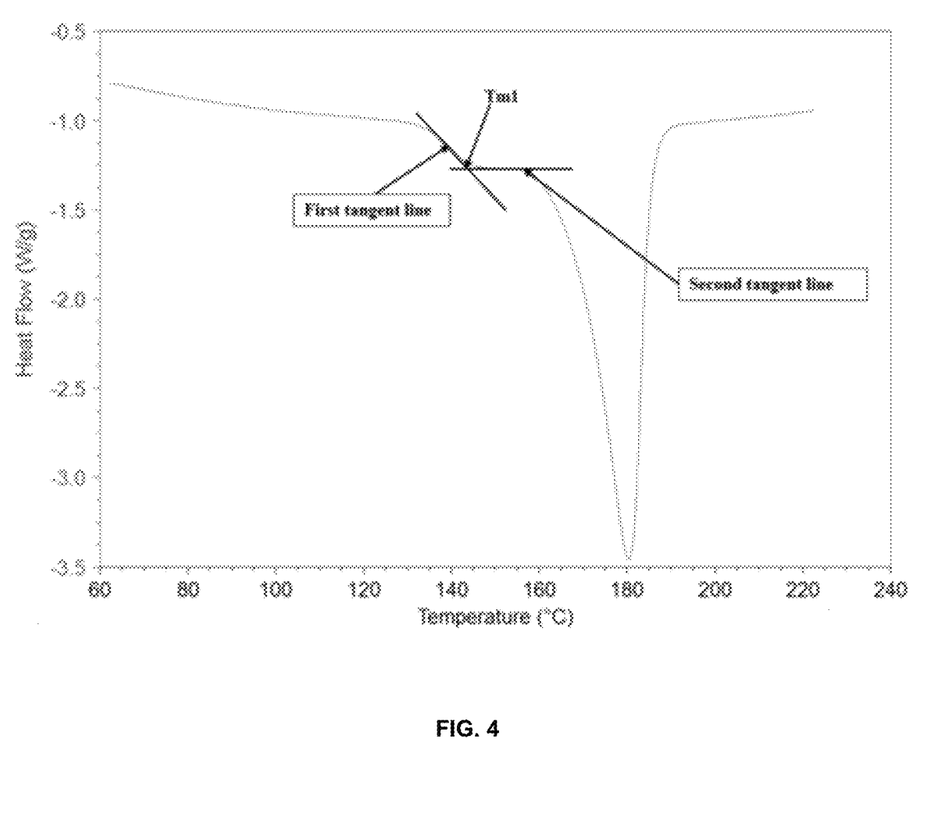
FIG. 4 is a differential scanning calorimetry graph for an exemplary pellet of ethylene-vinyl alcohol copolymer in accordance with aspects of the disclosure.

The melting point temperatures $T_{m2}$, and $T_{m3}$, and optionally $T_{m1}$, may be determined using a differential scanning calorimeter graph. The $T_{m1}$ (also referred to herein as the first, partial melting point temperature) represents the first intercept point of two tangent lines in the first DSC run. FIG. 4 is a differential scanning calorimetry graph for an exemplary pellet of ethylene-vinyl alcohol copolymer. As seen in FIG. 4, the $T_{m1}$ may be determined as the intersection of two tangent lines from the differential scanning calorimetry graph. More specifically, using FIG. 4, a first tangent line may be constructed at the inflection point to approximately the midpoint of the heat flow drop and a second tangent line may be constructed based on the where the slope decreases beginning after the first reference point. Based on the tangent lines, the first melting point temperatures may be calculated. The first, partial melting point temperature, $T_{m1}$, may in some instances be eliminated when no second tangent point exists, such as when $T_{m1}=T_{m2}$. Without being limited to any specific theory, it is believed that $T_{m1}$ can equal $T_{m2}$ when the particle lattice is neat and uniform. It is also believed that if the thickness of the lattice is too large, $T_{m1}$ and $T_{m2}$ may become similar and/or equal. For instance, as the dry temperature increases, the amorphous lamellar thickness and crystalline lamellar thickness increase, which also increases $T_{m1}$. If the amorphous lamellar thickness and crystalline lamellar thickness becomes too large, the difference between $T_{m1}$ and $T_{m2}$ becomes too small, and $T_{m1}$ will become similar or equal to $T_{m2}$.

The $T_{m2}$ (also referred to herein as the second melting point temperature) represents the maximum point of the melting peak in the first DSC run. The $T_{m3}$ (also referred to herein as the third melting point temperature) represents the maximum point of the melting peak in the second DSC run. Additional information relating to the determination of the $T_{m2}$ and the $T_{m3}$, and, optionally the $T_{m1}$, including use of the methods disclosed herein, may be found in ASTM International Standard D7028-07, *Standard Test for Glass Transition Temperature (DMA Tg) of Polymer Matrix Composites by Dynamic Mechanical Analysis (DMA)*, which is incorporated herein in its entirety for all purposes.

Preferably, the first, partial melting point temperature, $T_{m1}$, and the second melting point temperature, $T_{m2}$, are within 65° C. of each other. For example, the $T_{m1}$ and the $T_{m2}$ may be within 60° C. of each other, within 55° C., within 50° C., within 45° C., within 40° C., within 35° C., within 30° C., within 25° C., within 20° C., within 15° C., within 10° C., or within 5° C. of each other. In some instances, the difference between the first, partial melting point temperature, $T_{m1}$, and the second melting point temperature, $T_{m2}$, is 0° C., such as when the first, partial melting point temperature, $T_{m1}$, is equal to the second melting point temperature, $T_{m2}$.

Additionally or alternatively, the second melting point temperature, $T_{m2}$, and the third melting point temperature, $T_{m3}$, are within 4.5° C. of each other. In some instances, the $T_{m2}$ and the $T_{m3}$ may be within 4.5° C., within 4.3° C., within 4.1° C., within 4° C., within 3.8° C., within 3.6° C., within 3.4° C., within 3.2° C., within 3° C., within 2.8° C., within 2.6° C., within 2.4° C., within 2.2° C., within 2° C., within 1.8° C., within 1.6° C., within 1.4° C., within 1.2° C., within 1° C., within 0.8° C., within 0.6° C., or within 0.4° C. of each other.

The pellets of ethylene-vinyl alcohol copolymer may have a moisture content of 0.3 wt. % or less based on the total weight of the pellets of ethylene-vinyl alcohol copolymer. For example, the moisture content present in the pellets of ethylene-vinyl alcohol copolymer may be about 0.3 wt. % or less, about 0.28 wt. % or less, about 0.26 wt. % or less, about 0.24 wt. % or less, about 0.22 wt. % or less, about 0.2 wt. % or less, about 0.18 wt. % or less, about 0.16 wt. % or less, about 0.14 wt. % or less, about 0.12 wt. % or less, about 0.1 wt. % or less, about 0.08 wt. % or less, about 0.06 wt. % or less, about 0.04 wt. % or less, or about 0.02 wt. % or less, based on the total weight of the pellets of ethylene-vinyl alcohol copolymer.

The pellets of ethylene-vinyl alcohol copolymer may be formed substantially of ethylene-vinyl alcohol copolymer. For example, the pellets of ethylene-vinyl alcohol copolymer may comprises about 50 wt. % or more, about 60 wt. % or more, about 70 wt. % or more, about 80 wt. % or more, about 90 wt. % or more, about 92.5 wt. % or more, about 95 wt. % or more, about 96 wt. % or more, about 97 wt. % or more, about 98 wt. % or more, about 99 wt. % or more, or about 99.5 wt. % or more. In some cases, the pellets of ethylene-vinyl alcohol copolymer are essentially free or free of non-ethylene polymers.

The pellets of ethylene-vinyl alcohol copolymer may comprise one or more ethylene-vinyl alcohol copolymer. The one or more ethylene-vinyl alcohol copolymer may have an ethylene content of about 10 to about 45 mole %, about 15 to about 40 mole %, about 18 to about 37 mole %, about 20 to about 34 mole %, about 22 to about 34 mole %, about 24 to about 34 mole %, about 28 to about 34 mole %; about 20 to about 32 mole %, about 22 to about 32 mole %, about 24 to about 32 mole %, about 28 to about 32 mole %; about 20 to about 30 mole %, about 22 to about 30 mole %, about 24 to about 30 mole %, or about 28 to about 30 mole %, or any ranges therebetween. In some cases, the ethylene-vinyl alcohol copolymer may have an ethylene content of about 25 to about 75 mole %, about 30 to about 70 mole %, about 36 to about 65 mole %, about 40 to about 65 mole %, about 42 to about 65 mole %, about 44 to about 65 mole %; about 36 to about 60 mole %, about 40 to about 60 mole %, about 42 to about 60 mole %, about 44 to about 60 mole %; about 36 to about 55 mole %, about 40 to about 55 mole %, about 42 to about 55 mole %, about 44 to about 55 mole %; about 36 to about 50 mole %, about 40 to about 50 mole %, about 42 to about 50 mole %, or about 44 to about 50 mole %, or any ranges therebetween.

The ethylene-vinyl alcohol copolymer may have a degree of saponification that is preferably about 90 mole % or more, about 91 mole % or more, about 92 mole % or more, about 93 mole % or more, about 94 mole % or more, about 95 mole % or more, about 96 mole % or more, about 97 mole % or more, about 98 mole % or more, about 99 mole % or more, about 99.5 mole % or more, about 99.7 mole % or more, about 99.8 mole % or more, about 99.9 mole %, or about 99.95 mole %.

The pellets of ethylene-vinyl alcohol copolymer may comprise a boron content of about 15 to about 400 ppm. For example, the boron content of the ethylene-vinyl alcohol copolymer composition may range from about 20 to about 350 ppm, about 25 to about 300 ppm, about 30 to about 250 ppm, about 50 to about 200 ppm or about 60 to about 230 ppm, or any ranges therebetween. Additionally or alternatively, the ethylene-vinyl alcohol copolymer composition may have an amount of alkali metal ranging from 10 to 600 ppm. In some instances, the amount of alkali metal present in the ethylene-vinyl alcohol copolymer composition is from about 20 to about 550 ppm, about 30 to about 500 ppm, about 40 to about 450 ppm, about 50 to about 400 ppm, about 50 to about 380 ppm, about 80 to about 370 ppm, about 140 to about 360 ppm, about 250 to about 350 ppm, about 260 to about 340 ppm, about 270 to about 330 ppm, about 280 to about 320 ppm, or about 290 to about 310 ppm, or any ranges therebetween.

In accordance with another aspect of the disclosure, methods are provided for producing the pellets of ethylene-vinyl alcohol copolymer, such as those having the preferable lamellar stack properties, as described herein. A method for making pellets of ethylene-vinyl alcohol copolymer typically comprises:

(a) drying particles of ethylene-vinyl alcohol copolymer, wherein the drying comprises subjecting the particles of ethylene-vinyl alcohol copolymer to a three stage drying process using a particle stack thickness of 100 cm or less, the three stage drying process comprising a first stage, a second stage following the first stage, and a third stage following the second stage,
  (i) the first stage comprising heating the pre-dried particles to a temperature of at least 65° C. for at least 2 hours,
  (ii) the second stage comprising heating the pre-dried particles to a temperature of at least 95° C. for at least 16 hours, and
  (iii) the third stage comprising heating the pre-dried particles to a temperature of at least 105° C. for 12 hours, provided that the temperature of the second stage is greater than the temperature of the first stage, and the temperature of the third stage is greater than the temperature of the second stage, and
(b) pelletizing the particles of ethylene-vinyl alcohol copolymer to obtain pellets having lamellar stacks of ethylene-vinyl alcohol copolymer.

Figure 5:
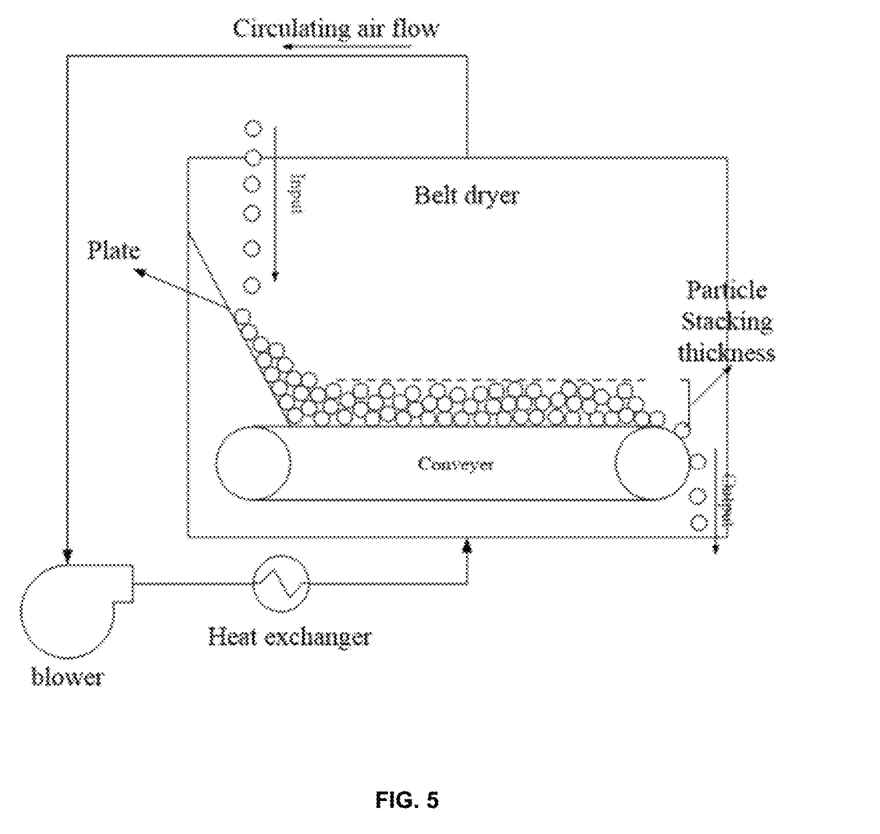
FIG. 5 is a schematic depicting a belt dryer for drying pellets of ethylene-vinyl alcohol copolymer in accordance with aspects of the instant disclosure.
Figure 6:
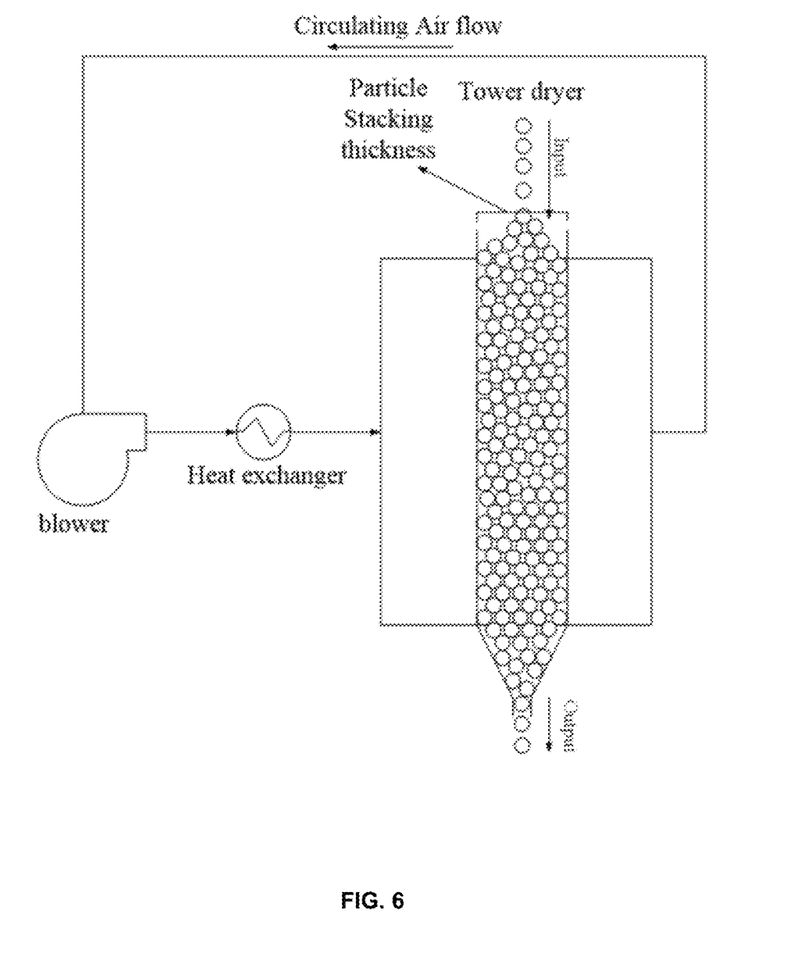
FIG. 6 is a schematic depicting a tower dryer for drying pellets of ethylene-vinyl alcohol copolymer according to aspects of the instant disclosure.

The method may include drying the particles of ethylene-vinyl alcohol copolymer using a belt type dryer, a tower type dryer, or the like prior to pelletizing the particles to obtain the pellets of ethylene-vinyl alcohol copolymer of the instant disclosure. The method may include drying particles obtained from pre-dried pellets. As used herein, pre-dried particles refers to particles that have been previously dried using any suitable method understood by one of ordinary skill. A schematic of a non-limiting example of a belt type dryer is shown in FIG. 5. A schematic of a non-limiting example of a tower type dryer is shown in FIG. 6. Preferably, the particles of ethylene-vinyl alcohol copolymer are dried with a belt type dryer. The particle stacking thickness during drying may have a mean diameter of 100 cm or less. For example the mean diameter for the particle stack thickness may be about 90 cm or less, about 80 cm or less, about 70 cm or less, about 60 cm or less, about 50 cm or less, about 40 cm or less, about 30 cm or less, about 20 cm or less, about 10 cm or less, or about 5 cm or less.

The air flow rate for drying the particles of ethylene-vinyl alcohol copolymer is believed to have an effect on the properties of the lamellar stacking of ethylene-vinyl alcohol copolymer. In some instances, the dryer (e.g., a belt type dryer) for drying the particles of ethylene-vinyl alcohol copolymer employs an air flow rate of at least 15 ton/hour. In some instances, the air flow rate employed by the dryer is at least 15 ton/hour, at least 17.5 ton/hour, at least 20 ton/hour, at least 22.5 ton/hour, at least 25 ton/hour, at least 27.5 ton/hour, at least 30 ton/hour, at least 32.5 ton/hour, or at least 35 ton/hour. In further instances, the air flow rate employed by the dryer is up to 100 ton/hour, up to 97.5 ton/hour, up to 95 ton/hour, up to 92.5 ton/hour, up to 90 ton/hour, up to 87.5 ton/hour, up to 85 ton/hour, up to 82.5 ton/hour, or up to 80 ton/hour. The particles of ethylene-vinyl alcohol copolymer may be dried until such pellets have a moisture content of about 0.3 wt. % or less, about 0.28 wt. % or less, about 0.26 wt. % or less, about 0.24 wt. % or less, about 0.22 wt. % or less, about 0.2 wt. % or less, about 0.18 wt. % or less, about 0.16 wt. % or less, about 0.14 wt. % or less, about 0.12 wt. % or less, about 0.1 wt. % or less, about 0.08 wt. % or less, about 0.06 wt. % or less, about 0.04 wt. % or less, or about 0.02 wt. % or less, based on the total weight of the pellets of ethylene-vinyl alcohol copolymer.

The inventors discovered that drying the particles of ethylene-vinyl alcohol copolymer with a three-stage drying procedure at certain temperatures for specific amounts of time effects the properties of the pellet after pelletizing the particles, such as the properties of the lamellar stacks. In particular, the inventors believe that controlling the temperature and the amount of time of the third stage of drying may effects the properties of the pellet.

The method may include a first stage of drying the particles that comprises heating the pre-dried particles to a temperature of at least 65° C. for at least 2 hour. In some instances, the pellets are heated at a temperature of at least 65° C., at least 70° C., at least 75° C., at least 80° C., at least 85° C., at least 90° C., at least 95° C., or at least 100° C. during the first stage of drying. The first stage of drying may include drying the particles for at least 2 hours, at least 2.5 hours, at least 3 hours, at least 3.5 hours, at least 4 hours, at least 4.5 hours, or at least 5 hours.

The second stage of drying the particles may comprise heating the pre-dried particles to a temperature of at least 95° C. for at least 16 hour. In some instances, the particles are heated at a temperature of at least 95° C., at least 100° C., at least 105° C., at least 110° C., at least 115° C., at least 120° C., at least 125° C., or at least 130° C. during the second stage of drying. Preferably, the temperature for the second stage of drying the particles is greater than the temperature for the first stage of drying the particles. The second stage of drying may include drying the pellets for at least 16 hours, at least 17 hours, at least 18 hours, at least 19 hours, at least 20 hours, at least 21 hours, or at least 24 hours.

The third stage of drying the particles may comprise heating the pre-dried particles to a temperature of at least 105° C. for at least 12 hour. In some instances, the particles are heated at a temperature of at least 105° C., at least 110° C., at least 115° C., at least 120° C., at least 125° C., at least 130° C., at least 135° C., at least 140° C., at least 145° C., at least 150° C., at least 155° C., at least 160° C., at least 165° C., at least 170° C., at least 175° C., at least 180° C., during the third stage of drying. Preferably, the temperature for the third stage of drying the particles is greater than the temperature for the second stage of drying the particles. The third stage of drying may include drying the particles for at least 12 hours, at least 13 hours, at least 14 hours, at least 15 hours, at least 16 hours, at least 17 hours, at least 18 hours, at least 19 hours, at least 20 hours, at least 21 hours, at least 22 hours, at least 23 hours, at least 24 hours, at least 25 hours, at least 26 hours, at least 27 hours, at least 28 hours, at least 29 hours, at least 30 hours, at least 31 hours, at least 32 hours, at least 33 hours, at least 34 hours, at least 35 hours, at least 36 hours, at least 37 hours, at least 38 hours, at least 39 hours, or at least 40 hours.

In some instances, the temperature is maintained within a range of 20° C. during at least one of the first stage, the second stage, and the third stage. In other words, in some instances, the temperature does not increase or decrease outside of a range of 20° C., such that the different between the highest temperature and the lowest temperature during at least one of the first stage, the second stage, and/or the third stage is 20° C. or less. In further instances, the temperature during at least two or during all of the first stage, the second stage, and the third stage is maintained within a range of 20° C.

EXAMPLES

The following non-limiting examples are provided primarily for the purposes of elucidating the benefits and properties achieved by aspects of the invention.

Example 1

Preparation of EVOH Pellets

Ethylene-vinyl alcohol copolymers were prepared with different ethylene contents and subsequently pelletized to form pellets of ethylene-vinyl alcohol copolymers (also referred herein as "EVOH pellets"). More specifically, the ethylene-vinyl alcohol copolymers (also referred herein as "EVOH copolymers") were produced by polymerizing ethylene vinyl acetate ("EVAC") polymers from ethylene and vinyl acetate monomers. The EVAC copolymer were saponified to form EVOH copolymer.

The EVOH copolymer was pelletized using an underwater pelletizing process to form pre-product EVOH pellets. The pre-product EVOH pellets were centrifuged to separate the pre-product EVOH pellets into EVOH particles. The EVOH particles were then washed with water and subjected to a drying procedure.

The EVOH particles were dried using a three stage drying procedure. Table 1, provided below, provides the temperatures and the period of time for each of the three drying stages applied to the EVOH particles.

TABLE 1

| | Drying Temp. (° C.) | Stage 1 Duration (hrs) | Drying Temp. (° C.) | Stage 2 Duration (hrs) | Drying Temp. (° C.) | Stage 3 Duration (hrs) | Dryer type | Air flow of dryer (Ton/hr) | Thickness of particle stacking in dryer (cm) |
|---|---|---|---|---|---|---|---|---|---|
| Example EVOH Particles 1 | 65 | 2 | 95 | 16 | 110 | 24 | Belt | 25 | 38 |
| Example EVOH Particles 2 | 65 | 2 | 95 | 16 | 125 | 24 | Belt | 25 | 42 |
| Example EVOH Particles 3 | 65 | 2 | 95 | 16 | 135 | 24 | Belt | 25 | 22 |
| Example EVOH Particles 4 | 65 | 2 | 95 | 16 | 140 | 24 | Belt | 25 | 15 |
| Example EVOH Particles 5 | 65 | 2 | 95 | 16 | 145 | 24 | Belt | 25 | 8 |
| Example EVOH Particles 6 | 65 | 2 | 95 | 16 | 155 | 24 | Belt | 25 | 18 |
| Example EVOH Particles 7 | 65 | 2 | 95 | 16 | 125 | 16 | Belt | 25 | 52 |
| Example EVOH Particles 8 | 65 | 2 | 95 | 16 | 125 | 20 | Belt | 25 | 68 |
| Example EVOH Particles 9 | 65 | 2 | 95 | 16 | 125 | 28 | Belt | 25 | 75 |
| Example EVOH Particles 10 | 65 | 2 | 95 | 16 | 125 | 32 | Belt | 25 | 81 |
| Example EVOH Particles 11 | 65 | 2 | 95 | 16 | 110 | 24 | Belt | 15 | 96 |
| Example EVOH Particles 12 | 65 | 2 | 95 | 16 | 125 | 24 | Belt | 15 | 81 |
| Example EVOH Particles 13 | 65 | 2 | 95 | 16 | 135 | 24 | Belt | 15 | 72 |
| Example EVOH Particles 14 | 65 | 2 | 95 | 16 | 140 | 24 | Belt | 15 | 63 |
| Example EVOH Particles 15 | 65 | 2 | 95 | 16 | 145 | 24 | Belt | 15 | 95 |
| Example EVOH Particles 16 | 65 | 2 | 95 | 16 | 155 | 24 | Belt | 15 | 100 |
| Example EVOH Particles 17 | 65 | 2 | 95 | 16 | 125 | 16 | Belt | 15 | 5 |
| Example EVOH Particles 18 | 65 | 2 | 95 | 16 | 125 | 20 | Belt | 15 | 15 |
| Example EVOH Particles 19 | 65 | 2 | 95 | 16 | 125 | 28 | Belt | 15 | 77 |
| Example EVOH Particles 20 | 65 | 2 | 95 | 16 | 125 | 32 | Belt | 15 | 54 |
| Example EVOH Particles 21 | 65 | 2 | 95 | 16 | 110 | 24 | Belt | 20 | 38 |
| Example EVOH Particles 22 | 65 | 2 | 95 | 16 | 95 | 24 | Belt | 20 | 24 |
| Example EVOH Particles 23 | 65 | 2 | 95 | 16 | 135 | 24 | Belt | 20 | 77 |
| Example EVOH Particles 24 | 65 | 2 | 95 | 16 | 140 | 24 | Belt | 20 | 65 |
| Example EVOH Particles 25 | 65 | 2 | 95 | 16 | 145 | 24 | Belt | 20 | 43 |
| Example EVOH Particles 26 | 65 | 2 | 95 | 16 | 155 | 24 | Belt | 20 | 24 |
| Example EVOH Particles 27 | 65 | 2 | 95 | 16 | 125 | 16 | Belt | 20 | 18 |
| Example EVOH Particles 28 | 65 | 2 | 95 | 16 | 125 | 20 | Belt | 20 | 16 |
| Example EVOH Particles 29 | 65 | 2 | 95 | 16 | 125 | 28 | Belt | 20 | 38 |
| Example EVOH Particles 30 | 65 | 2 | 95 | 16 | 125 | 32 | Belt | 20 | 24 |
| Comparative EVOH Particles 1 | 65 | 2 | 95 | 16 | 95 | 24 | Belt | 25 | 135 |
| Comparative EVOH Particles 2 | 65 | 2 | 95 | 16 | 100 | 24 | Belt | 25 | 178 |
| Comparative EVOH Particles 3 | 65 | 2 | 95 | 16 | 125 | 4 | Belt | 25 | 240 |
| Comparative EVOH Particles 4 | 65 | 2 | 95 | 16 | 125 | 8 | Belt | 25 | 450 |
| Comparative EVOH Particles 5 | 65 | 2 | 95 | 16 | 125 | 12 | Belt | 25 | 1000 |
| Comparative EVOH Particles | 65 | 2 | 95 | 16 | 125 | 24 | Tower | 25 | 985 |
| Comparative EVOH Particles 7 | 65 | 2 | 95 | 16 | 125 | 24 | Belt | 10 | 436 |

TABLE 1-continued

| | Drying Temp. Stage 1 (° C.) | Stage 1 Duration (hrs) | Drying Temp. Stage 2 (° C.) | Stage 2 Duration (hrs) | Drying Temp. Stage 3 (° C.) | Stage 3 Duration (hrs) | Dryer type | Air flow of dryer (Ton/hr) | Thickness of particle stacking in dryer (cm) |
|---|---|---|---|---|---|---|---|---|---|
| Comparative EVOH Particles 8 | 65 | 2 | 95 | 16 | 95 | 24 | Belt | 15 | 113 |
| Comparative EVOH Particles 9 | 65 | 2 | 95 | 16 | 100 | 24 | Belt | 15 | 165 |
| Comparative EVOH Particles 10 | 65 | 2 | 95 | 16 | 125 | 4 | Belt | 15 | 232 |
| Comparative EVOH Particles 11 | 65 | 2 | 95 | 16 | 125 | 8 | Belt | 15 | 345 |
| Comparative EVOH Particles 12 | 65 | 2 | 95 | 16 | 125 | 12 | Belt | 15 | 742 |
| Comparative EVOH Particles 13 | 65 | 2 | 95 | 16 | 125 | 24 | Tower | 15 | 638 |
| Comparative EVOH Particles 14 | 65 | 2 | 95 | 16 | 125 | 24 | Belt | 10 | 514 |
| Comparative EVOH Particles 15 | 65 | 2 | 95 | 16 | 95 | 24 | Belt | 20 | 438 |
| Comparative EVOH Particles 16 | 65 | 2 | 95 | 16 | 125 | 4 | Belt | 20 | 440 |
| Comparative EVOH Particles 17 | 65 | 2 | 95 | 16 | 125 | 8 | Belt | 20 | 452 |
| Comparative EVOH Particles 18 | 65 | 2 | 95 | 16 | 125 | 12 | Belt | 20 | 513 |
| Comparative EVOH Particles 19 | 65 | 2 | 95 | 16 | 125 | 24 | Tower | 20 | 542 |
| Comparative EVOH Particles 20 | 65 | 2 | 95 | 16 | 125 | 24 | Belt | 10 | 378 |
| Comparative EVOH Particles 21 | 65 | 2 | 95 | 16 | 100 | 24 | Tower | 10 | 624 |

Exemplary EVOH particles 1-30 and Comparative EVOH particles 1-21 were subsequently formed into respective Exemplary EVOH pellets 1-30 and Comparative EVOH pellets 1-21.

Example 2

Evaluation of EVOH Pellets

The melting point characteristics and the properties of the EVOH pellets were assessed after the three stage drying procedure described in Example 1. Specifically, the EVOH pellets were evaluated to assess the melting point characteristics of the EVOH pellets. The long period, lamella thickness, and amorphous thickness of the lamellar stacking of the EVOH pellets were also evaluated. Additionally, the water moisture of the EVOH pellets was determined.

Evaluation of the Melting Point Characteristics

The melting point characteristics of the EVOH pellets were determined according to ISO 11357-3:2011, which is incorporated herein by reference in its entirety for all purposes. Specifically, the melting point characteristics of the EVOH pellets were measured using a TA Instrument DSC Q200 (The Tzero lid being TA Instrument T 170607 and the Tzero pan being a TA Instrument T 170620), analyzed by TA Instruments Universal analysis 2000, wherein the Differential Scanning calorimetry ("DSC") utilizes the following parameters:

1. Equilibrium at 50° C.;
2. Heat rate of 5° C./min and heat to 250° C. for the first run;
3. Equilibrium at 250° C.;
4. Cool rate of 5° C./min. and cool to 50° C.;
5. Equilibrium at 50° C.; and
6. Heat rate of 50° C./min and heat to 250° C. for the second run.

Exemplary EVOH pellets 1-30 and Comparative EVOH pellets 1-21 had three melting point temperatures, referred herein as $T_{m1}$, $T_{m2}$, and $T_{m3}$. As discussed above, when dry temperature increase, the amorphous lamellar thickness, the crystalline lamellar thickness increase, and the $T_{m1}$ increase. In some cases, when the amorphous lamellar thickness and the crystalline lamellar thickness is too large, the difference between the $T_{m1}$ and the $T_{m2}$ may become too small, and the $T_{m1}$ will be too similar to or equal to the $T_{m2}$.

The $T_{m1}$ represents the first intercept point of two tangent lines in the first DSC run. The $T_{m2}$ represents the maximum point of the melting peak in the first DSC run. The $T_{m3}$ represents the maximum point of the melting peak in the second DSC run. The three melting point temperatures ($T_{m1}$, $T_{m2}$, and $T_{m3}$) were determined using the DSC graphs. For the $T_{m1}$, the first tangent line was constructed at the inflection point to approximately the midpoint of the heat flow drop and the second tangent line was constructed at slope decrease beginning point of heat flow after the first tangent point.

Evaluation of the Long Period, Lamella Thickness, and Amorphous Thickness

The long period, lamella thickness, and amorphous thickness of the EVOH pellets were evaluated using procedures and equipment similar to that described above. In this Example, X-ray scattering angle data was obtained by fixing particles of the Exemplary EVOH pellets 1-30 and Comparative EVOH pellets 1-21 to the sample holder using Kapton tape (black heat-resistant tape) on both sides. After vacuuming, the sample was exposed to an X-ray for 300 seconds and analyzed under a 2D scattering spectrum. A 1D plot of 2θ was produced by taking an integral of the 2D scattering spectrum. The blank group was measured with two layers of Kapton tape, and a 1D map of 2θ versus intensity was obtained as the background value by the above method.

The resulting data for the blank was subtracted from the data for the particles of the EVOH pellets to obtain a sample intensity versus 2θ, 1D. FIG. 2 shows a graph of the 1D map of 2θ versus the scattering intensity using the following formula Q=4π sin θ/λ, after a one dimensional correlation function conversion. The one-dimensional correlation function γ(z) was obtained from the small angle X-ray raw data using the following formula:

$$\gamma(z)=(1\gamma(0))\int_0^\infty q^2[l(q)-l(q)_b]\cos(qz)dq$$

where z is the correlation distance along the direction from which the electron density distribution is measured. The l(q) value is the scattering intensity. Since the experimentally accessible q range is finite, the data was extended to both lower and higher q values. The $l(q)_b$ value is the background scattering intensity. The "intensity versus q" data are linearly extrapolated from the smallest measured q value to zero.

FIG. 3 shows the intersection of the tangent line from Z=0 and the lowest point of the curve, which is identified as the amorphous thickness ("$l_a$"), starting from the lowest point. The highest point of the graph of FIG. 3 is identified as the long period ("L"), and L minus "$l_a$" is equal to lamella thickness ("$l_c$").

Moisture Content of Pellets

As used herein, the moisture content refers to the weight percentage of the volatile component in the pellets. The moisture content of the pellets was measured by the following method. First, the weight of a single aluminum cup (weight: C1) was measured. 2 g of pellets were placed into the aluminum cup, and the weight (C1+P1) of the aluminum cup containing the pellet (weight: P1) was measured using a Mettler toledo XPE504. The aluminum cup with the pellets was then heated at a temperature of 210° C. for 30 minutes in an oven FD56 oven, commercially available from Binder.

After heating the pellets, the aluminum cup and pellets were placed in electronic moisture meter. Then the aluminum cup and pellets were kept in a desiccator for 30 minutes, and before being returned to room temperature (e.g., 23° C.). The weight (C1+P2) of the aluminum cup containing pellets (weight: P2) was then measured, and the moisture content (% by weight) was calculated by the following mathematical formula.

Water content (% by weight)=[{(C1+P1)−(C1+P2)}/
{(C1+P1)−C1}]×100

={(P1−P2)/P1}×100

The melting point temperatures and the properties of the EVOH pellets are provided below in Table 2.

TABLE 2

|  | $T_{m2}-T_{m1}$ (° C.) | $T_{m3}-T_{m2}$ (° C.) | Moisture Content (wt. %) | Average Long Period | Average Crystalline Lamella Thickness | Average Amorphous Lamellar Thickness |
|---|---|---|---|---|---|---|
| Example EVOH Pellet 1 | 64.8 | 4.5 | 0.37 | 8.35 | 6 | 2.35 |
| Example EVOH Pellet 2 | 54.7 | 3.23 | 0.28 | 8.48 | 6.01 | 2.47 |
| Example EVOH Pellet 3 | 43.2 | 2.14 | 0.25 | 8.73 | 6.37 | 2.36 |
| Example EVOH Pellet 4 | 11.8 | 1.85 | 0.14 | 10.35 | 7.1 | 3.25 |
| Example EVOH Pellet 5 | 8.21 | 1.43 | 0.14 | 9.35 | 6.7 | 2.65 |
| Example EVOH Pellet 6 | 0 | 0.65 | 0.06 | 10.09 | 7 | 3.09 |
| Example EVOH Pellet 7 | 57.1 | 4.2 | 0.27 | 8.36 | 6 | 2.36 |
| Example EVOH Pellet 8 | 55.7 | 3.9 | 0.28 | 8.38 | 6.03 | 2.35 |
| Example EVOH Pellet 9 | 52.1 | 3.1 | 0.25 | 8.61 | 6.2 | 2.41 |
| Example EVOH Pellet 10 | 49.8 | 2.4 | 0.16 | 9 | 6.5 | 2.5 |
| Example EVOH Pellet 11 | 63.8 | 4.3 | 0.31 | 8.4 | 6.03 | 2.37 |
| Example EVOH Pellet 12 | 55.4 | 3.54 | 0.25 | 8.39 | 6.04 | 2.35 |
| Example EVOH Pellet 13 | 39.2 | 2.9 | 0.15 | 9 | 6.5 | 2.5 |
| Example EVOH Pellet 14 | 18.9 | 2.1 | 0.09 | 10 | 6.7 | 3.3 |
| Example EVOH Pellet 15 | 7.21 | 1.6 | 0.09 | 10.23 | 7.1 | 3.13 |
| Example EVOH Pellet 16 | 0 | 0.75 | 0.02 | 12.53 | 8.1 | 4.43 |
| Example EVOH Pellet 17 | 64.3 | 4.1 | 0.29 | 8.43 | 6.07 | 2.36 |
| Example EVOH Pellet 18 | 59.8 | 3.9 | 0.27 | 8.45 | 6.04 | 2.41 |
| Example EVOH Pellet 19 | 53.2 | 3.7 | 0.23 | 8.74 | 6.22 | 2.52 |
| Example EVOH Pellet 20 | 49.9 | 3.4 | 0.2 | 8.38 | 6 | 2.38 |
| Example EVOH Pellet 21 | 63.2 | 4.5 | 0.25 | 8.39 | 6.02 | 2.37 |

TABLE 2-continued

| | $T_{m2}-T_{m1}$ (° C.) | $T_{m3}-T_{m2}$ (° C.) | Moisture Content (wt. %) | Average Long Period | Average Crystalline Lamella Thickness | Average Amorphous Lamellar Thickness |
|---|---|---|---|---|---|---|
| Example EVOH Pellet 22 | 54.1 | 4.2 | 0.18 | 8.43 | 6.05 | 2.38 |
| Example EVOH Pellet 23 | 47.6 | 3.1 | 0.12 | 8.55 | 6.1 | 2.45 |
| Example EVOH Pellet 24 | 21.3 | 2.03 | 0.07 | 9.2 | 6.4 | 2.8 |
| Example EVOH Pellet 25 | 5.4 | 1.9 | 0.07 | 9.36 | 6.7 | 2.66 |
| Example EVOH Pellet 26 | 0 | 0.6 | 0.01 | 9.36 | 6.6 | 2.76 |
| Example EVOH Pellet 27 | 64.8 | 4.3 | 0.25 | 14.26 | 7.8 | 6.46 |
| Example EVOH Pellet 28 | 60.4 | 3.9 | 0.2 | 12 | 6.9 | 5.1 |
| Example EVOH Pellet 29 | 59.8 | 3.7 | 0.15 | 9.79 | 6.8 | 2.99 |
| Example EVOH Pellet 30 | 57.4 | 3.5 | 0.13 | 9.65 | 6.6 | 3.05 |
| Comparative EVOH Pellet 1 | 82.3 | 6.3 | 0.45 | 7.08 | 5.35 | 1.73 |
| Comparative EVOH Pellet 2 | 74.6 | 5.4 | 0.41 | 7.65 | 5.82 | 1.83 |
| Comparative EVOH Pellet 3 | 83.4 | 6.1 | 0.55 | 7.66 | 5.62 | 2.04 |
| Comparative EVOH Pellet 4 | 77.9 | 5.8 | 0.36 | 7.48 | 5.49 | 1.99 |
| Comparative EVOH Pellet 5 | 72.1 | 5.3 | 0.36 | 7.62 | 5.84 | 1.78 |
| Comparative EVOH Pellet 6 | 69.3 | 4.8 | 0.28 | 7.73 | 5.95 | 1.78 |
| Comparative EVOH Pellet 7 | 68.2 | 4.7 | 0.28 | 7.98 | 5.8 | 2.18 |
| Comparative EVOH Pellet 8 | 84.3 | 7.1 | 0.44 | 8.15 | 5.88 | 2.27 |
| Comparative EVOH Pellet 9 | 73.2 | 5.9 | 0.35 | 7.98 | 5.9 | 2.08 |
| Comparative EVOH Pellet 10 | 71.2 | 5.5 | 0.84 | 7.28 | 5.62 | 1.66 |
| Comparative EVOH Pellet 11 | 69.4 | 5.2 | 0.46 | 7.37 | 5.58 | 1.79 |
| Comparative EVOH Pellet 12 | 67.3 | 4.9 | 0.38 | 7.52 | 5.93 | 1.59 |
| Comparative EVOH Pellet 13 | 68.4 | 4.82 | 0.35 | 7.55 | 5.94 | 1.61 |
| Comparative EVOH Pellet 14 | 69.2 | 4.61 | 0.35 | 7.36 | 5.48 | 1.88 |
| Comparative EVOH Pellet 15 | 81.4 | 7.5 | 0.32 | 7.43 | 5.34 | 2.09 |
| Comparative EVOH Pellet 16 | 74.3 | 7.1 | 0.47 | 7.6 | 5.82 | 1.78 |
| Comparative EVOH Pellet 17 | 72.1 | 6.9 | 0.37 | 7.74 | 5.93 | 1.81 |
| Comparative EVOH Pellet 18 | 67.3 | 5.6 | 0.35 | 7.81 | 5.81 | 2 |
| Comparative EVOH Pellet 19 | 68.3 | 5.3 | 0.18 | 7.78 | 5.71 | 2.07 |
| Comparative EVOH Pellet 20 | 55.4 | 4.9 | 0.18 | 7.85 | 5.84 | 2.01 |
| Comparative EVOH Pellet 21 | 71.3 | 7.3 | 0.27 | 7.72 | 5.92 | 1.8 |

Example 3

Production of Multi-Layer EVOH Films

Multi-layer EVOH films were produced from Example EVOH pellets 1-30 and Comparative EVOH pellets 1-21. After drying Example EVOH pellets 1-30 and Comparative EVOH pellets 1-21, the EVOH pellets were fed into a three-layer coextruder to produce a multi-layer EVOH film with the following structure of layers: (I)/(III)/(II). Layer I was formed from Example EVOH pellets 1-30 and Comparative EVOH pellets 1-21. Layer II was formed from polyethylene (specifically Lotrene FD0274). Layer III was formed from ADMER NF408E, which is proprietary resin manufactured by Mitsui Chemicals, Inc. Thus, the multi-layer EVOH films had a structure of a first, outer layer formed from one of the Example EVOH pellets 1-30 or Comparative EVOH pellets 1-21; a second, middle layer of ADMER NF408E; and a third, outer layer of polyethylene.

Example 4

Evaluation of Multi-Layer EVOH Films

The multi-layer EVOH films were evaluated to assess the appearance, uniformity, and stability of electric current of each of the multi-layer EVOH films. Five sections having a 10 cm by 10 cm dimensions were evaluated from each of the multi-layer EVOH films for the aforementioned characteristics.

The appearance of each multi-layer EVOH film was evaluated by determining the number and the size of gel spots within the five sections of multi-layer EVOH film. If a high transparence with no gel spots was observed in the five sections of multi-layer EVOH film, the multi-layer EVOH film was given a superior rating, represented below with "O." If any of the five sections exhibited gel spots and the average size of the gel spots was between 25 μm and 1 mm, the multi-layer EVOH film was given an acceptable rating, represented below with "Δ." If any of the five sections exhibited gel spots and the average size of the gel spots was more than 1 mm, the multi-layer EVOH film was given an inferior rating, represented below with "X."

The uniformity of the multi-layer EVOH films was evaluated by determining the standard deviation of the thickness for each of the five sections of each multi-layer EVOH film. If the standard deviation of the thickness for each of the five sections of multi-layer EVOH film was within 5%, then the multi-layer EVOH film was given an excellent rating, represented below with "⊚." If the standard deviation of the thickness for any of the five sections of multi-layer EVOH film was greater than 5% and all five sections had a standard deviation for the thickness of 10% or less, then the multi-layer EVOH film was given an superior rating, represented below with "O." If the standard deviation of the thickness for any of the five sections of multi-layer EVOH film was greater than 10 and all five sections had a standard deviation for the thickness of 20% or less, then the multi-layer EVOH film was given an acceptable rating, represented below with "Δ." If the standard deviation of the thickness for any of the five sections of multi-layer EVOH film was greater than 20%, then the multi-layer EVOH film was given an inferior rating, represented below with "X."

The stability of electric current of the multi-layer EVOH films was evaluated by recording the electric current of the extrude motor every 10 minutes (i.e., 7 times) over 1 hour. If the standard deviation of the electric current of the multi-layer EVOH film was 5% or less, then the multi-layer EVOH film was given an excellent rating, represented below with "⊚." If the standard deviation of the electric current of the multi-layer EVOH film was greater than 5% and 10% or less, then the multi-layer EVOH film was given an superior rating, represented below with "O." If the standard deviation for the electric current of the multi-layer EVOH film was greater than 10% and 20% or less, then the multi-layer EVOH film was given an acceptable rating, represented below with "Δ." If the standard deviation for the electric current of the multi-layer EVOH film was greater than 20%, then the multi-layer EVOH film was given an inferior rating, represented below with "X."

Table 3, below, provides the evaluation of the appearance, uniformity, and stability of electric current of each of the multi-layer EVOH films.

TABLE 3

| | Uniformity of the film thickness | Appearance of the film | Electrical Current |
|---|---|---|---|
| Multi-layer film of Example EVOH Pellet 1 | O | Δ | O |
| Multi-layer film of Example EVOH Pellet 2 | O | Δ | O |
| Multi-layer film of Example EVOH Pellet 3 | O | O | O |
| Multi-layer film of Example EVOH Pellet 4 | O | O | O |
| Multi-layer film of Example EVOH Pellet 5 | O | O | O |
| Multi-layer film of Example EVOH Pellet 6 | ⊚ | O | ⊚ |
| Multi-layer film of Example EVOH Pellet 7 | O | O | Δ |
| Multi-layer film of Example EVOH Pellet 8 | O | O | Δ |
| Multi-layer film of Example EVOH Pellet 9 | O | O | O |
| Multi-layer film of Example EVOH Pellet 10 | O | O | O |
| Multi-layer film of Example EVOH Pellet 11 | Δ | O | O |
| Multi-layer film of Example EVOH Pellet 12 | Δ | O | O |
| Multi-layer film of Example EVOH Pellet 13 | O | O | O |
| Multi-layer film of Example EVOH Pellet 14 | ⊚ | O | ⊚ |
| Multi-layer film of Example EVOH Pellet 15 | ⊚ | O | ⊚ |
| Multi-layer film of Example EVOH Pellet 16 | ⊚ | ⊚ | ⊚ |
| Multi-layer film of Example EVOH Pellet 17 | O | Δ | O |
| Multi-layer film of Example EVOH Pellet 18 | O | O | O |
| Multi-layer film of Example EVOH Pellet 19 | O | O | O |
| Multi-layer film of Example EVOH Pellet 20 | O | O | Δ |
| Multi-layer film of Example EVOH Pellet 21 | Δ | O | O |
| Multi-layer film of Example EVOH Pellet 22 | O | O | O |
| Multi-layer film of Example EVOH Pellet 23 | ⊚ | O | ⊚ |
| Multi-layer film of Example EVOH Pellet 24 | ⊚ | O | ⊚ |
| Multi-layer film of Example EVOH Pellet 25 | ⊚ | O | ⊚ |
| Multi-layer film of Example EVOH Pellet 26 | Δ | O | O |
| Multi-layer film of Example EVOH Pellet 27 | O | O | O |
| Multi-layer film of Example EVOH Pellet 28 | O | O | O |
| Multi-layer film of Example EVOH Pellet 29 | ⊚ | O | ⊚ |
| Multi-layer film of Example EVOH Pellet 30 | Δ | X | Δ |
| Multi-layer film of Comparative EVOH Pellet 1 | Δ | X | Δ |
| Multi-layer film of Comparative EVOH Pellet 2 | Δ | X | Δ |
| Multi-layer film of Comparative EVOH Pellet 3 | Δ | X | Δ |
| Multi-layer film of Comparative EVOH Pellet 4 | Δ | X | Δ |
| Multi-layer film of Comparative EVOH Pellet 5 | | | |

TABLE 3-continued

| | Uniformity of the film thickness | Appearance of the film | Electrical Current |
|---|---|---|---|
| Multi-layer film of Comparative EVOH Pellet 6 | Δ | X | Δ |
| Multi-layer film of Comparative EVOH Pellet 7 | Δ | X | Δ |
| Multi-layer film of Comparative EVOH Pellet 8 | X | X | X |
| Multi-layer film of Comparative EVOH Pellet 9 | X | Δ | X |
| Multi-layer film of Comparative EVOH Pellet 10 | Δ | X | Δ |
| Multi-layer film of Comparative EVOH Pellet 11 | Δ | X | Δ |
| Multi-layer film of Comparative EVOH Pellet 12 | Δ | X | Δ |
| Multi-layer film of Comparative EVOH Pellet 13 | Δ | X | Δ |
| Multi-layer film of Comparative EVOH Pellet 14 | Δ | X | Δ |
| Multi-layer film of Comparative EVOH Pellet 15 | X | X | X |
| Multi-layer film of Comparative EVOH Pellet 16 | Δ | X | Δ |
| Multi-layer film of Comparative EVOH Pellet 17 | Δ | X | Δ |
| Multi-layer film of Comparative EVOH Pellet 18 | Δ | X | Δ |
| Multi-layer film of Comparative EVOH Pellet 19 | Δ | X | Δ |
| Multi-layer film of Comparative EVOH Pellet 20 | Δ | X | Δ |
| Multi-layer film of Comparative EVOH Pellet 21 | Δ | X | Δ |

As used herein, all ranges provided are meant to include every specific range within, and combination of sub ranges between, the given ranges. Additionally, all ranges provided herein are inclusive of the end points of such ranges, unless stated otherwise. Thus, a range from 1-5, includes specifically 1, 2, 3, 4 and 5, as well as sub ranges such as 2-5, 3-5, 2-3, 2-4, 1-4, etc.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

As used herein, the terms "comprising," "having," and "including" are used in their open, non-limiting sense. The terms "a," "an," and "the" are understood to encompass the plural as well as the singular. The expression "one or more" means "at least one" and thus may include an individual characteristic or mixtures/combinations.

Other than in the operating examples, or where otherwise indicated, all numbers expressing quantities of ingredients and/or reaction conditions may be modified in all instances by the term "about," meaning within +/−5% of the indicated number. The term "substantially free" or "essentially free" as used herein means that there is less than about 2% of the specific characteristic. All elements or characteristics positively set forth in this disclosure can be negatively excluded from the claims.

What is claimed is:

1. Pellets of ethylene-vinyl alcohol copolymer comprising: lamellar stacks of ethylene-vinyl alcohol copolymer with a long period determined by small-angle X-ray scattering of at least 8.35 nm.

2. The pellets of claim 1, wherein the lamellar stacks of ethylene-vinyl alcohol copolymer has an average crystalline lamellar thickness of at least 6 nm.

3. The pellets of claim 1, wherein the lamellar stacks of ethylene-vinyl alcohol copolymer has an average amorphous lamellar thickness of at least 2.35 nm.

4. The pellets of claim 1 comprising melting point temperatures $T_{m2}$ and $T_{m3}$, and optionally $T_{m1}$, wherein the three melting point temperatures are determined by Differential Scanning calorimetry (DSC) according to ISO 11357-3:2011, and the $T_{m1}$, if present, represents a first intercept point of two tangent lines in a first DSC run, the $T_{m2}$ represents a maximum point of a melting peak in the first DSC run, and the $T_{m3}$ represents a maximum point of a melting peak in a second DSC run, wherein $T_{m1}<T_{m2}<T_{m3}$.

5. The pellets of claim 4, wherein the $T_{m1}$ and the $T_{m2}$ are within 65° C. of each other.

6. The pellets of claim 4, wherein the $T_{m1}$ and the $T_{m2}$ are within 40° C. of each other.

7. The pellets of claim 4, wherein the $T_{m2}$ and the $T_{m3}$ are within 4.5° C. of each other.

8. The pellets of claim 1 comprising 0.3 wt. % or less of moisture content, based on the total weight of the pellets.

9. The pellets of claim 8, wherein the ethylene-vinyl alcohol copolymer has an ethylene content of 29 to 44 mol. %.

10. Pellets of ethylene-vinyl alcohol copolymer comprising: ethylene-vinyl alcohol copolymer and 0.3 wt % or less of moisture content, based on the total weight of the pellets, wherein the ethylene-vinyl alcohol copolymer has an ethylene content of 29 to 44 mol. %, and further comprises:

lamellar stacks of the ethylene-vinyl alcohol copolymer with a long period determined by small-angle X-ray scattering of at least 8.35 nm, and melting point temperatures $T_{m2}$ and $T_{m3}$, and optionally $T_{m1}$, wherein the three melting point temperatures are determined by Differential Scanning calorimetry (DSC) according to ISO 11357-3:2011, and the $T_{m1}$, if present, represents a first intercept point of two tangent lines in a first DSC run, the $T_{m2}$ represents a maximum point of a melting peak in a first DSC run, and the $T_{m3}$ represents a maximum point of a melting peak in a second DSC run, wherein $T_{m1}<T_{m2}<T_{m3}$, the $T_{m1}$ and the $T_{m2}$ are within 65° C. of each other, and the $T_{m2}$ and the $T_{m3}$ are within 4.5° C. of each other.

11. A method for making the pellets of ethylene-vinyl alcohol copolymer of claim 1, the method comprising:

(a) drying particles of ethylene-vinyl alcohol copolymer, wherein the drying comprises subjecting the particles of ethylene-vinyl alcohol copolymer to a three stage drying process using a particle stack thickness of 100 cm or less, the three stage drying process comprising a first stage, a second stage following the first stage, and a third stage following the second stage,
(i) the first stage comprising heating the pre-dried particles to a temperature of at least 65° C. for at least 2 hours,
(ii) the second stage comprising heating the pre-dried particles to a temperature of at least 95° C. for at least 16 hours, and
(iii) the third stage comprising heating the pre-dried particles to a temperature of at least 95° C. for 12 hours,
wherein the temperature of the second stage is greater than the temperature of the first stage, and the temperature of the third stage is greater than the temperature of the second stage, and
(b) pelletizing the particles of ethylene-vinyl alcohol copolymer to obtain pellets having lamellar stacks of ethylene-vinyl alcohol copolymer.

12. The method of claim 11, wherein the drying is carried out using a belt type dryer.

13. The method of claim 12, wherein the belt type dryer has an air flow rate of at least 15 ton/hr.

14. The method of claim 11, wherein the pellets comprise 0.3 wt. % or less of moisture content, based on the total weight of the pellets.

15. The method of claim 14, wherein the ethylene-vinyl alcohol copolymer has an ethylene content of 29 to 44 mole %.

16. The method of claim 11, wherein the lamellar stacks of ethylene-vinyl alcohol copolymer has a long period determined by small-angle X-ray scattering of at least 8.35 nm.

17. The method of claim 16, wherein the lamellar stacks of ethylene-vinyl alcohol copolymer has an average crystalline lamellar thickness of at least 6 nm.

18. The method of claim 16, wherein the lamellar stacks of ethylene-vinyl alcohol copolymer has an average amorphous lamellar thickness of at least 2.35 nm.

19. The method of claim 11, wherein the pellets comprise melting point temperatures $T_{m2}$ and $T_{m3}$, and optionally $T_{m1}$, wherein the three melting point temperatures are determined by Differential Scanning calorimetry (DSC) according to ISO 11357-3:2011, and
the $T_{m1}$, if present, represents a first intercept point of two tangent lines in a first DSC run,
the $T_{m2}$ represents a maximum point of a melting peak in the first DSC run, and
the $T_{m3}$ represents a maximum point of a melting peak in a second DSC run, wherein $T_{m1}<T_{m2}<T_{m3}$.

20. The method of claim 19, wherein the $T_{m1}$ and the $T_{m2}$ are within 65° C. of each other.

21. The method of claim 20, wherein the $T_{m1}$ and the $T_{m2}$ are within 40° C. of each other.

22. The method of claim 18, wherein the $T_{m2}$ and the $T_{m3}$ are within 4.5° C. of each other.

23. The method of claim 11, wherein:
(i) the first stage comprising heating the pre-dried particles to a temperature of at least 65° C. for at least 2 hour,
(ii) the second stage comprising heating the pre-dried particles to a temperature of at least 95° C. for at least 16 hours, and
(iii) the third stage comprising heating the pre-dried particles to a temperature of at least 110° C. for 16 hours.

24. The method of claim 23, wherein the temperature is maintained within a range of 20° C. during at least one of the first stage, the second stage, and the third stage.

* * * * *